INVENTORS
ROBERT E. FEARON
JEAN M. THAYER
BY
ATTORNEY

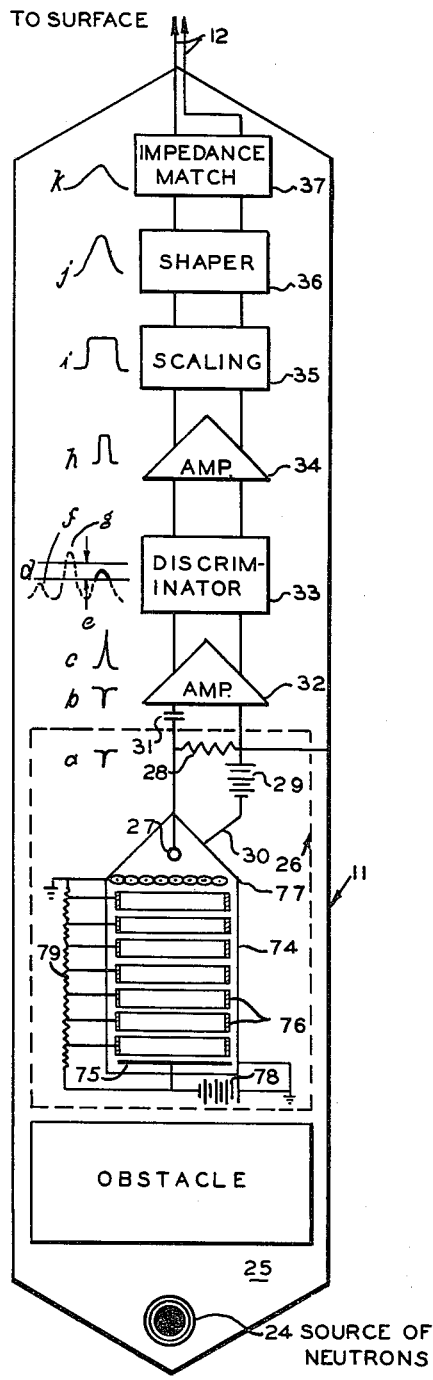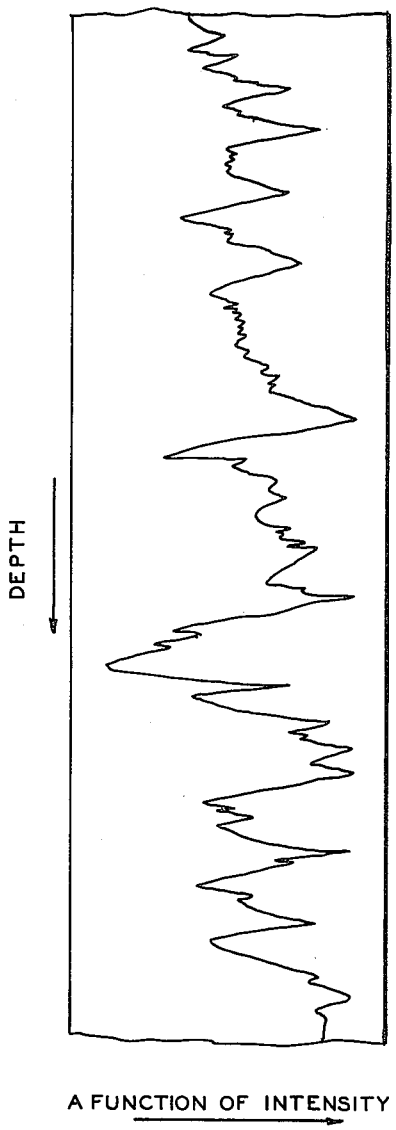

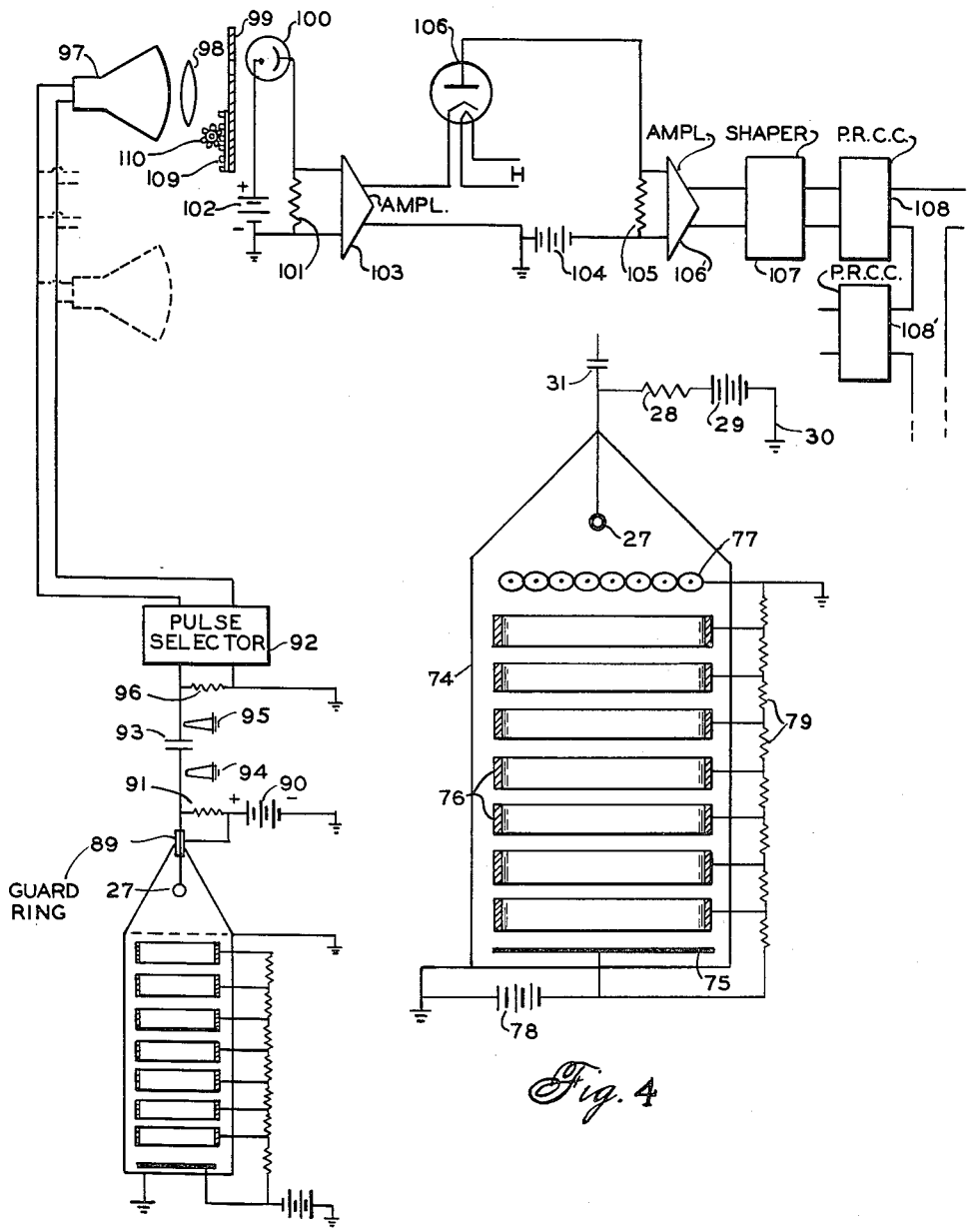

3,019,337
WELL LOGGING BY SELECTIVE DETECTION OF NEUTRONS BY RESONANT CAPTURE

Robert E. Fearon and Jean M. Thayer, Tulsa, Okla., assignors to Well Surveys, Inc., a corporation of Delaware
Original application July 30, 1949, Ser. No. 107,806, now Patent No. 2,712,081, dated June 28, 1955. Divided and this application Apr. 19, 1954, Ser. No. 423,972
5 Claims. (Cl. 250—83.1)

This invention relates generally to a method and apparatus for identifying substances existing in difficultly accessible locations, for example, adjacent to a deep narrow drill hole, and more particularly to a method and apparatus for identifying and distinguishing these substances from each other by nuclear reactions in the substances. This is a division of our copending application Serial No. 107,806, filed July 30, 1949 for a Method and Apparatus for Neutron Well Logging, now U.S. Patent No. 2,712,081.

This invention is directed to the solution of a problem which has been long recognized by geologists and geophysicists, and by others, confronted with the problem of locating valuable substances, such as petroleum, in the sub-surface formations of the earth. The problem of discovering with certainty the existence of a particularly valuable substance in the sub-surface formations of the earth has only been partially solved by the prior art workers. All prior efforts to solve the problem have met with failure for the reason that no parameter could be found which was solely characteristic of the valuable substances that it was desired to locate. As an example, in the art of well logging a partial solution to the problem goes as far as determining with certainty that either salt water or petroleum exists in a particular formation but a complete solution is not possible, since prior to this invention, no parameter was known whereby the two substances could be distinguished, in situ, from each other.

Numerous other methods advanced by the workers in the prior art for locating valuable substances in the sub-surface formations of the earth include: electrical methods which involve the measurement of self-potential, conductivity, and resistivity; thermal methods; seismic methods which treat of the acoustical properties of the subsurface formations; natural radioactivity of the formations; and those methods in which the formations are irradiated with radioactive radiations and an effect such as the gamma radiation produced by the neutron interactions in the formations measured. All of these methods as well as others which have not been enumerated above, have not afforded a complete solution to the above problem in that none of them measures a parameter that is solely characteristic of the valuable substances that one is desirous of locating.

For the purpose of particularly describing and setting forth the respects in which this invention differs from and represents advancement upon the prior art, there is set forth a description of the efforts of previous workers insofar as they have been directed to the problem which has been stated in the previous paragraph.

The location of petroleum has been attempted by various well logging methods which are sensitive to some physical characteristic imparted to the rocks by the presence of petroleum in them. For example, resistivity methods in combination with other methods somewhat ambiguously enable detection of petroleum. The inconvenience and uncertainty of the use of resistivity methods arise from the fact that resistivity is a general property of rocks, and is possessed by some rocks not containing petroleum to an even greater extent than the degree to which the property is manifested by certain other rocks full of petroleum. For example, Indiana limestone will be found to have a much higher resistivity than oil saturated sandstone of the Frio formation in the Gulf Coast oil fields. Furthermore, sandstane which contains natural gas, has a high resistivity, as does also coal. Moreover, limestone may show a decrease of resistivity where an oil bearing horizon appears. It could similarly be shown how each and every one of the other non-nuclear logging methods have specific shortcomings which analogously prevent them from being or amounting to a specific recognition of petroleum.

The instant invention provides a complete solution to the above problem. This solution consists of a system of observations by which the operator is enabled to recognize and quantitatively measure nuclear species of the subsurface formations adjacent a bore hole. Although the desired substances quite often are not elements of single nuclear species the chemical laws of combining proportions enable accurate appraisal of such things as the occurrence of petroleum. Recognition of nuclear species is accomplished by subjecting the substance adjacent to the bore hole to bombardment with penetrating radiations of a nature to cause specific and determinative quantized changes in the potential energy of the said nuclear species. These quantized energy changes which are specific to the particular kinds of atoms to be determined are used as a means of recognizing the desired atoms, which recognition is accomplished by means of selective neutron detection, selective for specific energy ranges of neutrons, and/or specific limits of direction of incidence and sense of direction of incidence.

Among the means which are required for the solution of the above problem, there is provided exceedingly powerful and energetically efficient monoenergetic neutron sources, relying upon the nuclear reactions caused by electrical or electromagnetically accelerated particles. These are provided in a form which is adapted to be lowered into a bore hole, and employed therein to bombard the rocks adjacent to the bore hole. Otherwise required for the practice of this invention are powerful capsuled neutron-emitting sources, depending for their operation upon energetic particles emitted by radioactive substances. There is set forth the manner of choosing and designing such neutron-emitting sources, showing how a person skilled in the art can avail himself of intensities hundreds of times greater than those which are now available.

Required in the practice of this method are various means of observing neutrons which permit the determination of the energy.

Among these means, there is provided a device for detecting phenomena described in nuclear physics as n-p reactions. This device enables exact determination of energy of neutrons, and a somewhat ambiguous determination of direction.

Therefore the primary object of this invention is the provision of a method and apparatus for identifying valuable substances by separately measuring the influence of specific properties of the nuclei of the valuable substances upon a flux of fast neutrons.

Another important objects of this invention is the provision of a method and apparatus whereby petroleum can be positively identified in the subsurface strata adjacent a bore hole.

This invention also contemplates a method and means for locating valuable substances situated in difficultly accessible locations by identifying and measuring the influence of at least one of its elementary components on a flux of fast neutrons.

Still another object of this invention is to achieve the above objects by irradiating formations with fast neutrons and measuring the intensity of neutrons falling within specific energy bands and which have rebounded from the formations.

Another object of this invention is to provide a method and means for producing a log of a drill hole by recording versus depth the average rate of occurrence of processes occasioned by fast neutrons of selected energies which enter the detecting device.

A further object of this invention resides in the provision of a method and means for detecting neutrons, selecting pulses produced thereby whose energies lie in a predetermined range, and recording their time-rate of occurence versus depth.

Other objects and advantages of the present invention will become apparent from the following detailed description when considered with the drawings, in which FIGURE 1 is a schematic illustration of a well logging operation showing the surface recording system;

FIGURE 2 is a diagrammatic illustration of a subsurface instrument with the detector illustrated in vertical section;

FIGURE 3 illustrates the type of well log that would be produced by the present invention;

FIGURE 4 shows in perspective a vertical section of a novel detector;

FIGURE 5 illustrates schematically a system for classifying the nergy of ionizing processes occurring in a fast neutron detector;

Figure 6:
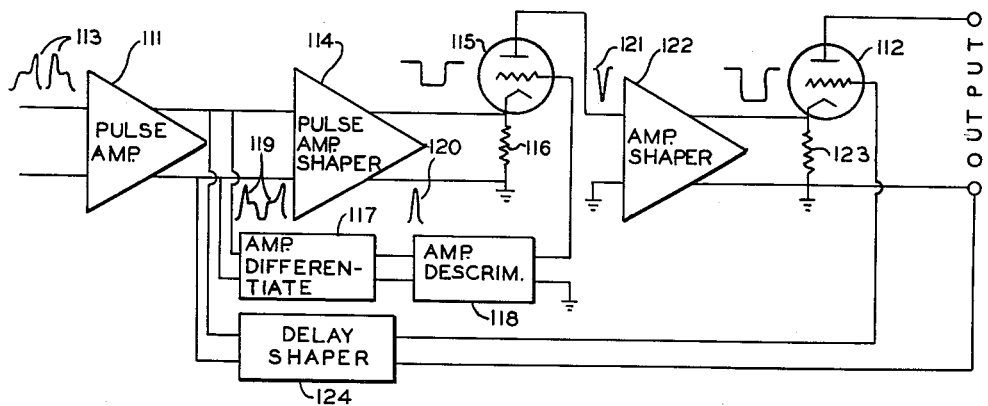
Figure 7:
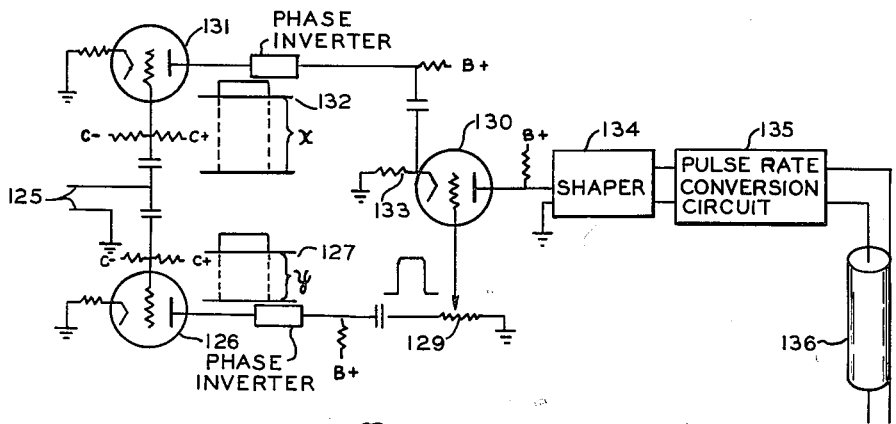

FIGURE 6 schematically illustrates a system whereby ionizing events caused by n-p or n-α processes occurring in a detector of fast neutrons may be selected and faithfully transmitted; and FIGURE 7 is a schematic diagram of an electrical system whereby pulses of a particular range of height can be selected out of a class of pulses containing all heights.

As pointed out above, consideration of the problem of well logging has led to the conclusion that there is a necessity for the discovery of methods which will identify more specifically the substances found in the rocks adjacent to wells which are logged. Specific identifying properties, which could be relied upon as a means of recognition of substances, must be able to cause an effect which is observable under the logging conditions which prevail. Preferably the process making the observations possible should be one which acts through space and through matter which fills the space between the position in which the rock to be identified is found, and the location of the detecting apparatus in the bore hole. The necessity for acting through space arises because of the prevalence of casing and/or cement and/or fluid of various sorts which commonly exist in the well bores, and which interfere with the measuring process. Another reason why considerable action through space is essential is the need for the depth of investigation to be adequate. Considerable depth of investigation is a highly desirable factor in well logging because of the heterogeneity of rocks making shallow observations unrepresentative, and therefore inaccurate as a representation of the whole mass of rock penetrated.

There are available at the present time only a very few types of influences by which desirable observations as discussed above may be made. Obviously, the magnetic and electric fluxes are not available for consideration in connection with cased wells, and the electric flux is unusable when investigating non-conducting material. The observation of the heat flux is familiar in the art of well logging and has patently the disadvantage that such observations are slow if one desires a considerable depth of investigation. The transmission of observable infrared and ultraviolet radiations is excluded because of the opacity of substances generally present in the earth and in bore holes. The gravitational flux has satisfactory properties, and, in principle, could be measured. But no known means of measuring it for well logging purposes has been found.

In attacking the above problem, seeking for a method of specific recognition of material in the circumstances of a bore hole penetrating the rock strata of the earth, it has been discovered that there are apparent specific properties of atomic nuclei corresponding with energy transitions in those nuclei. These transitions may evidence themselves in a variety of ways, such as:

(a) The emission of radiant energy through space.

(b) The absorption of a particular amount of energy from a bombarding particle or quantum.

(c) A specific energy threshold or a plurality of energy thresholds of susceptibility of the nuclei to certain classes of nuclear change, which may be caused by bombarding corpuscles of quanta.

It has been discovered that in all branches of molecular, atomic, and sub-atomic physics, one may generally predict that if a specific energy transition is possible in a quantized system, there will be a resonance effect, specifically affecting bombarding particles or qaunta possessing energy (either kinetic or potential) in the close vicinity of the amount required to produce a quantized transition. The discovery of the detatils of quantization of nuclei of atoms still waits for extensive experimental and theoretical work. Limited experimental evidence has already brought support to the conviction which exists in the minds of all nuclear physicists to the effect that nuclei will surely be found to be quantized system. In some instances energy threshold of various kinds have already been determined for nuclei. For example, the photo-neutron threshold is now known experimentally through the study of its inverse process, capture, by Kubischek and Dancoff.

A specific energy threshold at 20 mev. has been found for the system comprising 4 nucleons (2 protons and 2 neutrons). Sundry isomeric transitions corresponding with highly forbidden transformations of the arrangements of nucleons have been found experimentally and can be considered as additional evidence of the truth and experimental significance of the general conclusion that nuclear matter exists in quantized energy states.

In an effort to make use of the foregoing general conclusion, it has been discovered that only two classes of radiation appear to exist which react with nuclear matter appreciably and can be arranged conveniently for the observation of quantized energy levels of nuclei. These classes of radiation are the photon or electromagentic class, and the corpuscular class comprising neutrons. Other particles (charged) in general do not penetrate the coulomb field of force surrounding a nucleus at energy falling in the range of possible excitation processes of common nuclei. Such excitation processes are typically expected for light nuclei in the vicinity of 1 million electron volts.

Charged particles lack action through a distance as defined herein. Therefore, corpuscular radiations of the charged variey would, in principle, not be particularly useful for investigation of the quantized levels of nuclei. Of the classes of radiation which have been suggested, the only one which has been discovered which has a favorable ratio for the amount of interaction which it undergoes with nuclear matter, as compared with the energy transitions effected in the progress of the radiation by circumstances arising outside the nuclei of atoms, is the neutron. The photon reacts extensively with orbital electrons, and has only a very small cross section (target probability) for interactions with nuclei as such. There is furthermore an additional reaction of photons which becomes prominent above 2 mev., and which, in the range above 2 mev. results in materialization of electron-positron pairs. This materialization, though influenced by the presence in the near vicinity of the nuclear field of force, does not represent a specific or identifying characteristic of particular nuclei, but is a general characteristic of all nuclei, more prominent for the nuclei of heavy elements like lead and less prominent for the nuclei of light elements such as aluminum. For the above listed reasons, there appear to be only a few especially simple reactions caused by photons which might be of any use.

One might find it desirable to observe the neutrons released from nuclei by photons, since there is, for such nuclear photo-neutrons, a specific threshold of energy for each nuclear species (element or isotope thereof). One might also investigate the "unmodified" Compton scattering of energetic photon radiations in the hope of finding some slightly modified lines which suffered loss of energy by interaction with nuclei. This possibility is somewhat favored by the fact that the otherwise much stronger modified Compton scattering radiation is rapidly eliminated from the flux by absorption.

On the other hand, the interaction of neutrons with the outside parts of the atom is so small that the direct production of ion-pairs by neutrons is found to occur on an average of only about one time per meter of ordinary atmospheric air for a neutron possessing a kinetic energy of five million electron volts. The liberation of energy by neutrons in air therefore amounts to less than one thousandth of 1% per meter of air traversed, for energy liberated by processes involving the outside portions of the atoms found in the air. A distance of travel in air which would result in an average loss of energy by reaction with outside parts of the atoms of less than 1%, would, nevertheless, result in total absorption of the neutrons, and all their energy, by reaction with the nuclei of the atoms contained in air. Even so, many of the reactions which neutrons undergo, which occur between neutrons and nuclei of the matter, are not highly specific, nor do they aid in any refined efforts to identify such matter. Among the unidentifying nuclear reactions one may name, for example, conservative ballistic nuclear scattering of neutrons, that is, conservative of total kinetic energy. This process is specifically different to an extreme degree only in the case of very light elements such as hydrogen and helium. The average nature of other matter contained in the rocks is sufficiently alike in this respect that the main possibility of use of the property of conservative ballistic nuclear scattering of neutrons is to observe differences in the propagation of neutrons through the rock which enable conclusions regarding the presence of hydrogen to be made. This effect is already made use of, and there exist a considerable number of U.S. Patents and other published descriptions bearing on this subject. Among these patents are No. 2,308,361, No. 2,220,509, and No. 2,349,712. The broad class under which these previously named inventions fall corresponds with a patent issued to John C. Bender, No. 2,133,776.

The theory of detection of hydrogen by conservative ballistic nuclear scattering is treated in an article written by Robert E. Fearon and published in the June, 1949, issue of Nucleonics, entitled "Neutron Well Logging."

Figure 1:
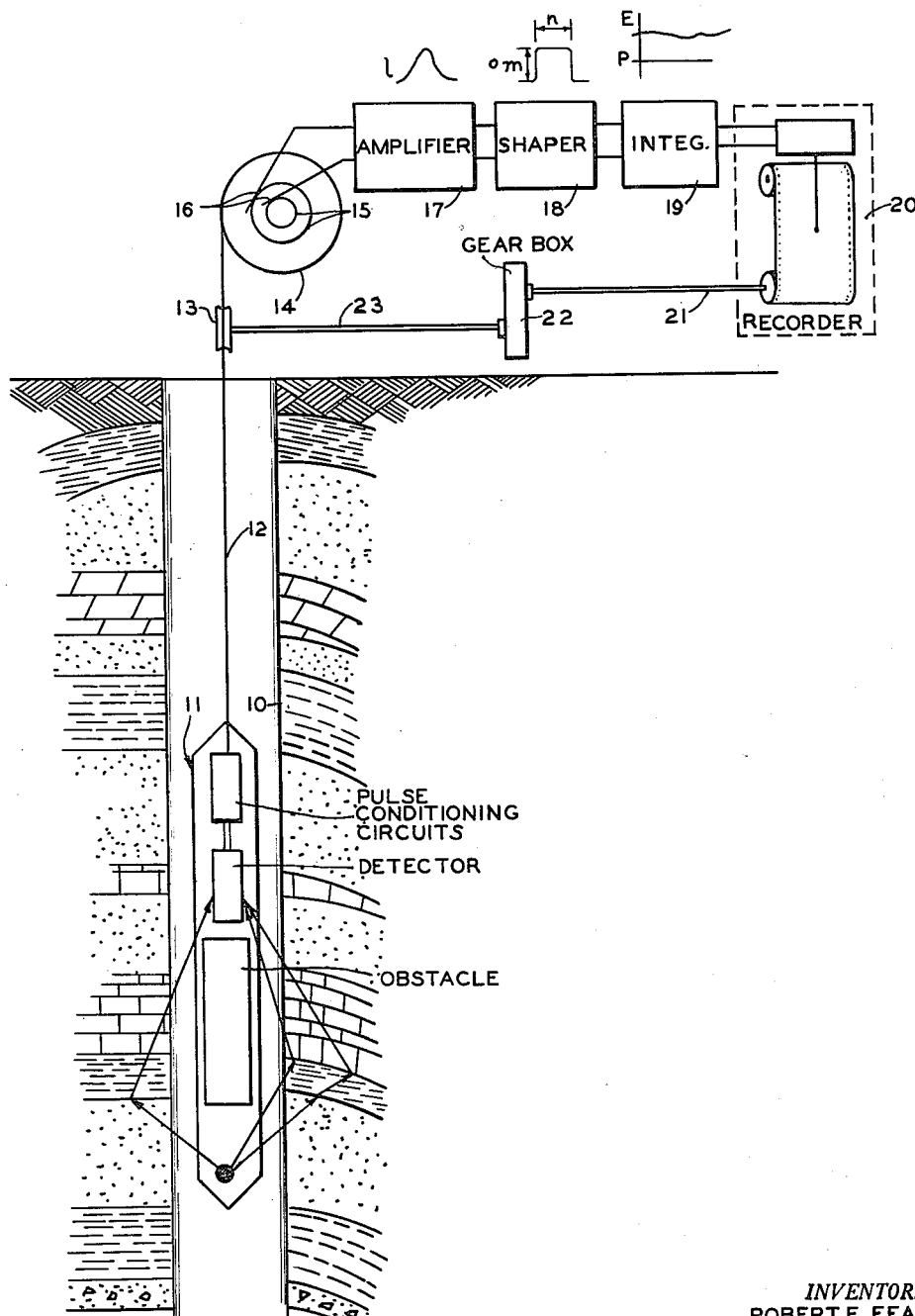

The above principles find general application in pursuing this method, and FIGURES 1 and 2 more particularly set forth the details of arrangements through which these general concepts find specific application to the problem set forth above.

Referring to these figures there is illustrated an application of this invention to a well surveying system. In FIGURE 1 there is shown schematically a drill hole 10 which may or may not be cased. Disposed in the drill hole and adapted to be raised or lowered therein is a housing 11 supported by a cable 12. Cable 12 comprises at least one electrical conductor connecting the electrical apparatus within the housing 11 to apparatus located adjacent the mouth of the drill hole 10. The apparatus on the surface of the earth consists of a measuring wheel 13 over which the cable 12 passes and a winch or drum 14 on which the cable is wound, or from which it is unwound, when the housing 11 is raised or lowered in the drill hole 10. Conductors are connected to the cable 12 by means of slip rings 15 and brushes 16 carried on one end of drum 14. These conductors lead to an amplifier 17. Amplifier 17 is a conventional audio amplifier having a flat frequency response. The output of amplifier 17 is conducted to a pulse shaper 18, the purpose of which is to insure the delivery of square topped waves of constant height to an integrator 19. Integrator 19 is adapted to receive the aforementioned pulses and generate therefrom an electromotive force which is proportional to the average time-rate of occurrence of the pulses. This signal is delivered to the recorder 20 where it is recorded versus depth. The depth axis of the recorder is actuated by the shaft 21 which leads from a gear box 22, connecting through shaft 23 to the measuring wheel 13. The gear box 22 has adjustments to enable suitable choice of depth scales.

Referring specifically to FIGURE 2 a description of the contents of housing 11 will follow. It is to be understood that housing 11 will be constructed to withstand the pressures, and mechanical and thermal abuses encountered in surveying a deep bore hole and yet provide adequate space within it to house the necessary apparatus and permit the transmission of radiation through it.

In the bottom portion of housing 11 there is located a radiation source 24 which may be surrounded by a radiation filtering material 25. This radiation source may take various forms which will be described in detail later in the specification. Above the filtering material 25 and lying between the source of radiation and a radiation detector 26, there is a region of space which may be occupied by suitable materials or left vacant determined by considerations explained as the description progresses.

The detector 26 is of the type which will detect neutrons as a result of the production of prominent bursts of ionization therein, caused by rapid movements of heavy charged particles such as protons, alpha particles, etc., set in motion by the neutrons. The bursts of ionization are very quickly collected in the detector 26. These bursts are registered as electrical pulses and resolved timewise from other or smaller pulses which may occur almost concurrently. The detector 26 is so designed and so operated that the magnitude of the electrical pulse released from the collection of a specified amount of electrical charge will always be quite accurately proportional to the amount of the electrical charge collected and substantially independent of the path in the detector along which the burst of ionization occurred.

The current corresponding to a pulse, flowing in the electrode circuit which includes conductor 27, resistance 28, battery 29 and conductor 30, produces a voltage pulse across the resistance that is of; the form illustrated at $a$. The pulse produced across the resistance 28 is impressed through the condenser 31 upon the input of an amplifier 32. As shown at $b$ the pulse has suffered negligible loss and no distortion in passing through the condenser 31. The amplified pulse, illustrated at $c$, has been inverted in polarity but otherwise faithfully reproduced. It is then conducted to the pulse height distribution analyzer 33. Here only those pulses whose magnitude fall within a prescribed range, such as illustrated at $d$ and designated by $e$, are accepted and transmitted. Other pulses such as are illustrated at $f$ and $g$ are not accepted and transmitted. Those pulses which are accepted and transmitted are delivered to an amplifier 34. Amplifier 34 is one having a flat frequency response extending upward to the highest frequency required to faithfully amplify the pulse delivered to it in a manner shown at $h$. The output signal from the amplifier 34 is fed into a scaling circuit 35 which, in a known manner, delivers pulses as illustrated at $i$, the number of which, occurring in a given time is less by a constant factor than the number received in the same interval of time. The output of the scaling circuit is fed into a shaper 36 which transforms the pulse into the shape illustrated at $j$. The shaper 36 may take the form of a powdered iron core transformer. The signal from the transformer is then fed into impedance matching means 37, such as a cathode follower, which faithfully reproduces the voltage wave as illustrated at $k$. The impedance matching means 37 introduces the signal into the transmission line contained within the cable 12 for the purpose of transmitting it to the surface.

It is to be understood that all elements within the housing 11 which require power may be powered in a conventional manner as taught in the art by means such as batteries, or rectified alternating current. Batteries which very satisfactorily fulfill the temperature requirements in hot wells are the zinc, potassium hydroxide, mercuric oxide cells.

Again referring to FIGURE 1, the signals transmitted to the surface by means of cable 12 are taken therefrom by means of slip rings 15 and brushes 16 and are conducted to the amplifier as pulses, one of which is illustrated at $l$. These amplified pulses are received by a pulse shaper 18 which modifies their form in the manner illustrated at $o$. The pulse illustrated at $o$ will always have a fixed square form with a fixed height $m$ and a fixed width $n$. These substantially square pulses are then fed into the integrating circuit which delivers the signal to the recorder 20, as has been previously described. The integrating circuit thus produces a time-dependent voltage wave such as shown at $p$. When this signal is impressed on the recorder, which has been coordinated with depth, a curve will be drawn as shown in FIGURE 3. This curve has as its ordinate depth in the bore hole and as its abscissa a function of an intensity of received radiation, or of a plurality, or combination of intensities. These intensities may be combined by adding, subtracting, or dividing in any desired manner, or may be otherwise mathematically combined. The manner of combination is suitable to specifically indicate, or be especially sensitive to the presence of a particular substance in the region adjacent the bore hole.

Although no power supply has been shown in connection with the surface apparatus, it is to be understood that it will be powered in a conventional manner such as was pointed out in connection with the subsurface apparatus.

A method of measuring relative excesses or deficiencies of neutrons in a specific energy group out of a general distribution of neutrons of many energies incident upon a detector of fast neutrons will now be described. In this form of the invention neutrons incident upon an impulse ionization chamber will be measured.

The practice of this additional fast neutron measuring method involves the observation of processes in which the energy available in the processes is specifically related to the energy liberated through the action of ionizing particles set in motion by the neutrons. In previously described fast neutron measuring methods energies of neutrons incident upon the detector were measured by analyzing the statistical distribution of the recoil processes. In this method each neutron which reacts causes an ionizing process by which its energy may be individually determined.

The process which is most illustrative of the class which is employed is one that is commonly called an n-p reaction. An n-p reaction is a process involving a neutron and the nucleus of an atom in which the nucleus of the atom suffers a net gain of one electric charge and often a small net gain in the mass. The incident neutron may be thought of as being transformed into its other stationary state, in which it exists as a proton. The subtraction of the electric charge from the neutron, and its addition to this bombarded nucleus results in two products, a proton and a nucleus, both having mass of nuclear order of magnitude and possessing electrical charge, which therefore makes the intensity of ionizing action of these products very large, comparable with that of an alpha particle, and greater in ionizing intensity than gamma rays or beta rays.

The choice of an n-p reaction as a means for practicing this method is favored by the fact that there has been discovered a specific method for recognizing reactions of this kind, and differentiating them from recoil processes which were previously discussed in copending application Serial No. 107,806. The choice of n-p reactions is also favored by the fact that these reactions are a practically universal property of all bombarded nuclei, it being expected that, at suitable bombarding neutron energy, any gaseous substance whatever which may be mixed with helium in an impulse ionization chamber will give rise to such processes.

A particular advantage obtained through the selection of n-p reactions for use in connection with this method is that, by this means, one can produce a fast neutron detector which is selective and which is sensitive to certain energies of incident neutrons. This highly selective fast neutron sensitivity results from the existence of certain specific energy resonances for the production of n-p reactions, for example, those which have been experimentally observed in the case of nitrogen. As can be seen in the literature pertaining to this subject, n-p reactions and n-alpha reactions are similar in some ways, and are governed by the laws of conservation of energy, and their specific properties are determined by the velocity and characteristics of the recoiling nuclei and the lighter particles.

A particular characteristic of such a process, which is used as a method of recognizing it as an elastic scattering process, is that the recoiling nucleus because of its greater mass and electrical charge leaves a much denser electron cloud than a lighter particle, even though the latter particle is more energetic. It can be readily seen from the consideration of an impulse chamber such as is shown in FIGURE 4, that for the electrons corresponding with particle paths which are produced in the space below the screen 77, no influence in the output circuit connected to the electrode 27, will occur until such time as, these electrons being translated upward, pass through the screen 77.

If an ionizing path occurs in the space surrounded by the rings 76, and below the screen 77, in FIGURE 4, and is wholly contained therein, and that if this ionizing path is so directed that it has an appreciable component of its direction lying parallel to the axis of detector 74, then the electrons liberated by this path will be uniformly translated upward and will not come through the screen 77 simultaneously and enter into the region where they can be measured, but will come through this screen 77 in the order in which they were originally closest to the screen. The ones which were originally most distant will be the last to enter. An electrical pulse will therefore occur in the circuit coupled to electrode 27 which will represent, by its shape, if it is plotted versus time, the rate at which electrons were passing through the screen at various times; which rate will of course represent, piece by piece, the various sections of the ionizing track which are entering this screen. This uniform translation, and quantitatively similar piece by piece absorption of the successive sections of a liberated column of migrating electrons is made possible, and rendered accurate, by the provision of a uniform straight electrical field in the space below the screen 77 in the detector of FIGURE 4.

To recognize and observe exclusively the class of pulses caused by n-p reactions, means of pulse classification is provided. Such means takes the form of an electrical apparatus sensitive to the very sudden pulse caused by the dense cluster of ions associated with the heavy recoil nucleus.

N-p reactions in light elements fall in two general classes. One of these classes corresponds with the case in which no added kinetic energy is needed to make the reaction go. For this case the reaction will be caused by slow neutrons, and will have, in that instance, a total energy represented by the loss of mass occurring in the reaction. To use the n-p reaction of such a substance to detect fast neutrons, it is necessary to shut out slow and thermal neutrons. Suitable filters for this purpose may be put around the detector of fast neutrons and may consist of cadmium. It is to be understood that the housing of the detector may be formed in part by cadmium or other suitable material, such as cobalt, gold, boron and indium. Elements having n-α reactions caused by slow and thermal neutrons also may be used in fast neutron detectors, and similarly demand protection from slow neutrons. Examples of substances requiring such protection are nitrogen, helium three, and boron ten, which may be employed in its gaseous compounds. Gases characterized by the presence of elements oxygen, sulphur, and fluorine, are examples of n-p reactants not requiring protection from slow neutrons, as they react exclusively with fast neutrons.

The apparatus shown diagrammatically in FIGURE 5 can be used to measure the processes described above. In this figure there is shown a detecting system which employs a detector such as that shown in detail in FIGURE 4. The detector here shown differs from that of FIGURE 4 only in the provision of a guard ring 89. Potential is placed across the central electrode 27 and the housing, which housing is at ground potential, by a battery 90. Connected in series with the battery 90, is a resistance 91. The guard ring is connected to the positive end of the battery 90. The apparatus described up to this point is electrically coupled to a pulse selector 92 by means of a condenser 93. Condenser 93 is preferably mounted on two stand-off insulators 94 and 95. Resistance 96 is a conventional coupling resistance and may be a part of the pulse selector 92.

The pulse selector 92 is illustrated diagrammatically in FIGURE 6. This pulse selector makes it possible to observe only the processes described above which may take the forms shown at 113. Two pulses are shown at 113, one being the reverse of the other. These pulses may occur in the detector instrument in either form illustrated, or both. After being amplified by the amplifier 111 the pulses are introduced into three circuits to be described in order. The first circuit which includes the pulse amplifier 114 is what may be termed an enabling circuit, which enables the amplifier comprising tube 115 to become conductive when the detector output pulse is of specified length for a purpose to be described in connection with the next circuit. The output of amplifier 114 may be impressed across a resistor 116 connected in the cathode circuit of tube 112. The second circuit comprises an amplifier 117 which contains a high-pass filter, which may be in the form of a differentiator, and an amplifier 118 containing discriminating means. The circuit containing the elements 117 and 118 may be termed a peak recognition circuit. The signal which may take the form of one of the pulses illustrated at 119, is fed through elements 117 and 118 to derive a pulse of the form shown at 120. When this pulse is impressed on the grid of tube 115 simultaneously with the conditioning of the tube to render it conductive, there is derived from tube 115 a signal which has the form shown in 121. This signal is passed through an amplifier and pulse shaper 122, and is impressed upon a resistor 123 connected in the cathode circuit of the tube 112. Tube 112 is normally nonconductive, that is, biased to a point beyond cutoff. For the functioning of the tube 112, it is necessary to consider the third circuit which contains a time delay and shaping circuit 124. The signal output from element 124 is impressed on the grid of tube 112 at a time when it has been rendered uniformly conductive by the signal portion which has been impressed on the resistance 123 by the amplifier shaper 122. The output signal from tube 112 is conducted to the cathode-ray tubes 97 shown in FIGURE 5. Directly in front of each of the screens of the cathode ray tubes is an optical system 98 which delivers an image to an energy gate or selector slit 99. It is to be understood that each cathode ray tube is provided with such an optical system and all of the elements that will be described in connection with one cathode ray tube. There is provided a photoelectric cell 100 which is disposed directly in back of the selector slit 99. A resistance 101 and a battery 102 are connected in series with the photoelectric cell 100. Connected across resistance 101 is an amplifier 103 which has its output connected in a circuit that comprises a battery 104, a resistance 105, and a diode rectifier tube 106. Connected across resistance 105 is an amplifier 106' whose output is connected to a pulse shaping circuit 107. The output of the pulse shaping circuit is in turn connected to the pulse rate conversion circuit 108. The pulse rate conversion circuit 108 may have its output connected in series with other such units and recorded.

Selector slit 99 may be provided with a gear rack 109 in which a pinion gear 110 may be operated to change the position of the slit or energy gate 99.

Pulses are produced in the circuit connected to the electrode 27 in the manner which has been previously described, by collection of electrons by the electrode 27. These pulses, after being amplified and selected are delivered to a pair of deflection electrodes in a cathode ray tube. The time course of a pulse on a cathode ray tube may be thought of as a more or less smooth rise and fall of a fluorescent spot caused by a stream of electrons striking the screen. This more or less smooth rise and fall, for the sake of illustration, may be likened to the positive half-cycle of a sinusoidal wave. For a better understanding of this, attention is directed to pulses of the above described nature which consist of excursions of equal height on the cathode ray tube, and which are supposed to occur only in one direction, there being no long transient. It can readily be seen that the brightness of the streak of light, caused by the repeated occurrence of such pulses, will have a high maximum in the part of the pulse where the cathode ray beam may be regarded as stopping and turning around to return to the baseline in preparation for another pulse. If now the slit of the selector 99 is so arranged that this region of great brightness shows upon the slit, much larger electrical pulses will occur in the circuit connected to the photocell 100 than would occur if the image of the streak of light fell upon the slit in such a manner that a portion of smaller brightness entered in the region of the slit. Accordingly, therefore, the gain of amplifier 103 is chosen, and the magnitude of the voltage delivered by the battery 104 is taken, just sufficient that a pulse corresponding with the maximum brightness portion of the cathode ray streak causes a signal to be delivered into the amplifier 106' over the opposition of the battery 104. The signals delivered into amplifier 106' will not exist for slit positions on pulse heights corresponding with parts of the streak of a lower brightness, out of the pulse image on the selector 99.

The discussion which has just preceded sets forth the reasons why pulses of any height, other than those having their peaks falling upon the slot 99, will not be seen in the system coupled to amplifier 106'. Pulses of lower height will not be seen because no portion of the transit of the fluorescent spot caused by the electron stream falls upon the slit of selector 99. There will, therefore, be pulses delivered to amplifier 106' which concide in time with those events occurring in the circuit coupled to electrode 27, and only to those events which fall in a specified pulse height range. Because the output of amplifier 106' will be somewhat uncertain in regard to the size of pulse which it will deliver out of those which have been selected, there is provided an apparatus well known in the art, designated as element 107, the purpose of which is to equalize the size and time duration of the pulse furnished by amplifier 106', in order that these may be better utilized by suitable pulse rate conversion circuits.

An alternative method of measuring the above described processes is to use the apparatus shown in FIGURE 5 from the detector through the output of pulse selector 92; substituting the apparatus shown in FIGURE 6 for the pulse selector 92 in the manner described immediately above and introducing this output into the circuit at 125 in FIGURE 7. The output from this circuit may be conducted directly to the transmission cable 136 in a manner to be described. For simplicity, the description of that part of the circuit used from FIGURE 5, and the circuit illustrated in FIGURE 6, will not be repeated here.

The circuit shown diagrammatically in FIGURE 7 is essentially an anti-coincidence pulse counter circuit in which the signals are impressed upon the grid of an amplifier tube 126 which has been biased in the manner illustrated at 127 to a point beyond cutoff by an amount illustrated by the quantity "y." This tube then will pass only pulses whose height is greater than "y." The output of tube 126 is fed through an attenuator 129 to the grid of amplifier tube 130 to produce a function to be discussed later. The signal at 125 is also conducted into a second circuit which includes the amplifier tube 131. Tube 131 is biased, in the manner illustrated at 132, beyond cutoff an amount illustrated by "x," "x" being greater than "y" which is the bias for tube 126. Therefore, tube 131 will pass only signals whose height is greater than the value illustrated by "x." The signals from amplifier 131 are impressed across a resistor 133 which is connected in the cathode circuit of the amplifier tube 130. Tube 130 is biased in such a manner that it is normally conductive, however, when signals greater than $(x+\Delta)$ are impressed on tube 131 the tube 130 is rendered sufficiently nonconductive that signals from 126 will not be conducted through tube 130. The increment of signal $\Delta$ depends on the setting of potentiometer 129. Therefore, it is impossible for tube 130 to produce a signal in its plate circuit when coincident impulses, such as those illustrated at 127 and 132, are impressed upon the grid and cathode, respectively, of this tube. The signal output from tube 130 is fed into a shaping circuit indicated diagrammatically at 134. The shaped pulses are then impressed upon the pulse rate conversion circuit 135. The pulse rate conversion circuit converts the signals so far produced into a direct current which may be impressed directly upon the transmission cable 136 which leads to the recording equipment located on the surface of the earth adjacent the drill hole.

It is to be understood that the method of recognition herewith shown in FIGURES 5, 6 and 7 for the identification of n-p reactions, may also be used to identify and study n-α reactions. With suitable substances in the detecting chamber, such as nitrogen, n-α processes can be selected by exactly the same electrical means, and likewise, provide an exact indication of the energies of the neutrons which caused them.

We claim:

1. Apparatus for analyzing the energy spectrum of a flux of fast neutrons which comprises a confined ionizable gas containing a substantial amount of a first element the nuclei of which react with fast neutrons to produce nuclei of a second element and other heavy charged particles with all of the energy of each incident neutron and the net energy of the reaction going to the resultant charged particles, means for separately collecting the electronic portion of the charge released upon each reaction between a fast neutron and a nucleus of said first element, means for producing an electrical pulse systemically related to the electrons collected upon each reaction, and means for selecting those of said pulses having particular sizes as an indication of incident neutrons having related energies.

2. Apparatus for analyzing the energy spectrum of a flux of fast neutrons which comprises a confined gaseous atmosphere containing a substantial amount of an element which resonantly captures neutrons of particular energy, means for collecting the electronic portion of the charge released upon each reaction between a neutron and a nucleus of said element, means for producing an electrical pulse systematically related to the electrons collected upon each reaction, means for selecting those of said pulses characteristic of the resonant capture process, and means for measuring the selected pulses as an indication of incident neutrons having the resonant energy.

3. Apparatus for analyzing the energy spectrum of a flux of fast neutrons which comprises a confined ionizable gas containing a substantial amount of a first element the nuclei of which react with fast neutrons to produce nuclei of a second element and other heavy charged particles with all of the energy of each incident neutron and the net energy of the reaction going to the resultant charged particles, means for producing an electrical pulse systemmatically related to the ionization produced in said gas by each reaction between a fast neutron and a nucleus of said first element, and means for selecting those of said pulses having particular sizes as an indication of incident neutrons having related energies.

4. Apparatus for analyzing the energy spectrum of a flux of fast neutrons which comprises a confined ionizable gas containing a substantial amount of helium three, means for producing an electrical pulse systemmatically related to the energy released in said gas upon each reaction between a fast neutron and a nucleus of helium three, and means for selecting those of said pulses having particular sizes as an indication of incident neutrons having related energies.

5. Apparatus for analyzing the energy spectrum of a flux of fast neutrons which comprises a detection medium containing a substantial amount of a first element the nuclei of which react with fast neutrons to produce nuclei of a second element and other heavy charged particles with all of the energy of each incident neutron and the net energy of the reaction going to the resultant charged particles, means for producing an electrical pulse systematically related to the energy released in said medium upon each reaction between a fast neutron and a nucleus of said first element, and means for selecting those of said pulses having particular sizes as an indication of incident neutrons having related energies.

References Cited in the file of this patent

UNITED STATES PATENTS

| | | |
|---|---|---|
| 2,081,041 | Kott | May 18, 1937 |
| 2,481,506 | Gamertsfelder | Sept. 13, 1949 |
| 2,481,964 | Wollan | Sept. 13, 1949 |
| 2,483,139 | Herzog | Sept. 27, 1949 |
| 2,493,935 | Wiegand et al. | Jan. 10, 1050 |
| 2,531,144 | Manley | Nov. 21, 1950 |
| 2,534,932 | Sun | Dec. 19, 1950 |
| 2,636,994 | Neufeld | Apr. 28, 1953 |
| 2,793,309 | Simpson | May 21, 1957 |
| 2,845,544 | Seaborg et al. | July 29, 1958 |
| 2,874,306 | Kohman et al. | Feb. 17, 1959 |

OTHER REFERENCES

Pulse Height Analyzer—Model A, by W. A. Higinbotham, MDDC–1173, declassified Aug. 8, 1947.

Electronic Classifying, cataloging, and counting systems by G. Howard Parsons, AECD—1827, declassified Mar. 25, 1948.

UNITED STATES PATENT OFFICE
CERTIFICATE OF CORRECTION

Patent No. 3,019,337                                      January 30, 1962

Robert E. Fearon et al.

It is hereby certified that error appears in the above numbered patent requiring correction and that the said Letters Patent should read as corrected below.

Column 2, line 2, for "sandstane" read -- sandstone --; line 59, for "objects" read -- object --; column 4, line 11, for "of" read -- or --; column 10, line 55, for "slot" read -- slit --; column 11, lines 63 and 64, for "systemically" read -- systematically --; column 12, lines 20 and 28, for "systemmatically", each occurrence, read -- systematically --.

Signed and sealed this 12th day of June 1962.

(SEAL)
Attest:

ERNEST W. SWIDER                                  DAVID L. LADD
Attesting Officer                                      Commissioner of Patents